(12) United States Patent
Yuan et al.

(10) Patent No.: US 11,089,521 B2
(45) Date of Patent: Aug. 10, 2021

(54) NETWORK FALLBACK AND FAST RETURN

(71) Applicant: Verizon Patent and Licensing Inc., Arlington, VA (US)

(72) Inventors: Jun Yuan, Cranbury, NJ (US); Timothy M. Dwight, Richardson, TX (US); Hui Zhao, Marlboro, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/541,322

(22) Filed: Aug. 15, 2019

(65) Prior Publication Data
US 2021/0051529 A1 Feb. 18, 2021

(51) Int. Cl.
| | |
|---|---|
| H04W 36/00 | (2009.01) |
| H04W 36/14 | (2009.01) |
| H04W 80/10 | (2009.01) |
| H04W 28/20 | (2009.01) |
| H04W 76/11 | (2018.01) |
| H04W 4/16 | (2009.01) |

(52) U.S. Cl.
CPC ......... *H04W 36/0022* (2013.01); *H04W 4/16* (2013.01); *H04W 28/20* (2013.01); *H04W 36/14* (2013.01); *H04W 76/11* (2018.02); *H04W 80/10* (2013.01)

(58) Field of Classification Search
None
See application file for complete search history.

(56) References Cited

U.S. PATENT DOCUMENTS

| | | | |
|---|---|---|---|
| 2018/0139670 A1* | 5/2018 | Shaw | H04W 36/0061 |
| 2019/0059024 A1* | 2/2019 | Mufti | H04L 65/1073 |
| 2020/0068647 A1* | 2/2020 | Jha | H04W 76/16 |
| 2020/0100174 A1* | 3/2020 | Kim | H04W 76/11 |

* cited by examiner

*Primary Examiner* — Suhail Khan

(57) ABSTRACT

A method may include establishing a Fifth Generation (5G) a network connection with a user equipment (UE) device and receiving, by a 5G wireless station, information associated with handling voice communication sessions for the UE device. The method may also include receiving information, from the UE device or directed to the UE device, associated with a first voice communication session, signaling a Fourth Generation (4G) wireless station to establish a connection to the UE device, in response to receiving the information associated with the first voice communication session and establishing, by the 4G wireless station, a connection to the UE device. The method may further include conducting the first voice communication session over a 4G network, determining whether the first voice communication session has terminated and determining whether to reconnect to the 5G network, in response to determining that the first voice communication session has terminated.

20 Claims, 7 Drawing Sheets

NETWORK FALLBACK AND FAST RETURN

BACKGROUND INFORMATION

User devices associated with a Fifth Generation (5 G) New Radio (NR) system may have the capability to communicate via a 5 G NR network, as well as communicate via other networks, such as a Fourth Generation (4 G) Long Term Evolution (LTE) network. For example, an Evolved Universal Terrestrial Radio Access New Radio Dual Connectivity (EN-DC) device has the capability to exchange data with an LTE base station (e.g., an eNodeB), as well as exchange data with a 5 G next generation base station (e.g., a gNodeB).

However, in some instances, the 5 G radio access network (RAN) may not be fully deployed or optimized for voice communication sessions. To ensure an optimal calling experience for users in such instances, service providers may deploy mechanisms that cause the user device to use an LTE RAN and an LTE core network that supports LTE voice communication sessions. Using a 4 G LTE network in this manner is sometimes referred to as an evolved packet system (EPS) fallback.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein relate to performing a fallback from, for example, a higher bandwidth connection to a lower bandwidth connection (e.g., from 5 G to 4 G) in response to a user device receiving or initiating a voice call. The term "fallback" as used herein should be broadly construed to include a user device transitioning from a first standard technology to a second different standard technology or frequency (i.e., a higher bandwidth connection, such as a 5 G connection using millimeter (mm) wave technology, sub-6 frequency bands, etc., to a lower bandwidth connection, such as a 4 G LTE connection, etc.). In an exemplary implementation, upon connecting to a service provider's network, a user device may provide information regarding the user device's capability and/or preference to perform voice communication sessions using a certain technology, such as a voice over LTE (VoLTE) connection as opposed to a voice over new radio (VoNR) connection. Providing the user device capability and preference information may allow the service provider to switch the user to an appropriate network and provide the user with an optimal voice communication session regardless of the level of 5 G NR coverage. Switching the user to the appropriate network may also help increase efficiency at the service provider's network and enhance the user's experience.

Implementations described herein may also allow a user device involved in one or more active data sessions when a fallback occurs, to quickly return to a higher bandwidth connection after the voice communication session is terminated. In some instances, the network may automatically switch the user to the higher bandwidth connection, while in other implementations, the network may switch the user to the higher bandwidth connection based on data throughput needed by the user device at the current time, such as the data throughput needed for the active data sessions. In each case, the network may perform a "fast return" to a higher bandwidth connection to allow the user device to receive the needed data throughput without requiring the user device to go to an idle state or mode before reconnecting to the higher bandwidth network. In this manner, the user experience may be improved and network efficiency associated with allocating resources may be optimized.

Figure 1:
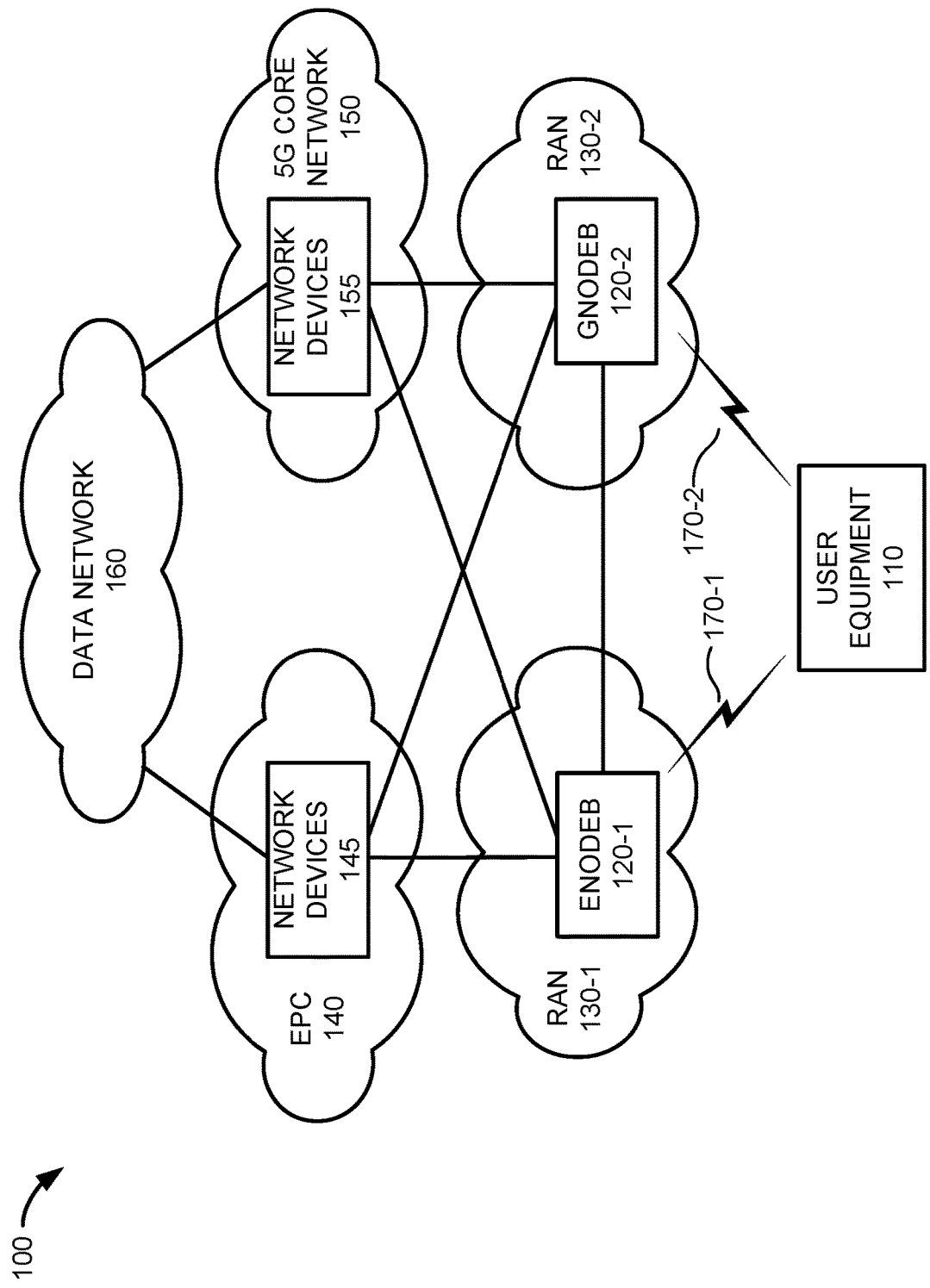
FIG. 1 illustrates an exemplary environment in which systems and methods described herein may be implemented.

FIG. 1 is a diagram of an exemplary environment 100 in which the systems and methods described herein may be implemented. Referring to FIG. 1, environment 100 includes user equipment (UE) 110, evolved node B (eNodeB) 120-1 (also referred to herein as wireless station 120-1) associated with radio access network (RAN) 130-1, next generation node B (gNodeB) 120-2 (also referred to herein as wireless station 120-2) associated with RAN 130-2, evolved packet core (EPC) 140 with network devices 145, 5 G core network 150 with network devices 155, and data network 160. Wireless stations 120-1 and 120-2 may be referred to herein collectively as wireless stations 120 and RANs 130-1 and 130-2 may be referred to herein collectively as RANs 130 and individually as RAN 130 or 130-X. In other embodiments, environment 100 may include additional networks, fewer networks, and/or different types of networks than those illustrated and described herein.

Environment 100 includes links between the networks and between the devices. For example, environment 100 may include wired, optical, and/or wireless links among the devices and the networks illustrated. A communication connection via a link may be direct or indirect. For example, an indirect connection may involve an intermediary device and/or an intermediary network not illustrated in FIG. 1. Additionally, the number and the arrangement of links illustrated in environment 100 are exemplary.

In the configuration illustrated in FIG. 1, UE 110 may use wireless channels 170-1 and 170-2 (referred to collectively as wireless channels 170) to access eNodeB 120-1 and gNodeB 120-2, respectively. Wireless channels 170 may correspond to, for example, a physical layer in accordance with different radio access technologies (RATs). For example, wireless channel 170-1 may correspond to the physical layer associated with 4 G standards (e.g., 3GPP standards for 4 G RANs, referred to herein as "4 G"), while wireless channel 170-2 may correspond to the physical layer associated with 5 G New Radio standards (e.g., 3GPP standards for 5 G RANs).

UE 110 (also referred to herein as UE device 110 or user device 110) may include any type of mobile or fixed device having multiple coverage mode capabilities, such as an EN-DC device that is able to communicate with different wireless stations (e.g., eNodeB 120-1 and gNodeB 120-2) using different wireless channels (e.g., channels 170) corresponding to different RANs (e.g., RANs 130-1and 130-2). UE 110 may include, for example, a cellular radiotelephone, a smart phone, a tablet, any type of internet protocol (IP) communications device, a Voice over Internet Protocol (VoIP) device, a personal computer (PC), a laptop computer, a notebook, a netbook, a wearable computer (e.g., a wrist watch, eye glasses, etc.), a gaming device, a media playing device, a digital camera that includes communication capabilities (e.g., wireless communication mechanisms such as Wi-Fi), etc. In other implementation, UE 110 may be implemented as a machine-type communications (MTC) device, an Internet of Things (IoT) device, a machine-to-machine (M2M) device, etc.

UE 110 may connect to RANs 130 and other devices in environment 100 via any conventional technique, such as wired, wireless, optical connections or a combination of these techniques. UE 110 and the person associated with UE 110 (e.g., the party holding or using UE 110) may be referred to collectively as UE 110 in the description below.

According to implementations described herein, UE 110 may be provisioned (e.g., via a subscriber identity module (SIM) card or another secure element) to recognize particular network identifiers (e.g., associated with RANs 130) and to support particular radio frequency (RF) spectrum ranges.

eNodeB 120-1 may include a network device that has computational and wireless communication capabilities. For example, eNodeB 120-1 may include a transceiver system that connects UE device 110 to other components of RAN 130-1 and EPC 140 using wireless/wired interfaces. In some implementations, eNodeB 120-1 may be implemented as a base station (BS), a base transceiver station (BTS), a Node B, an evolved LTE (eLTE) node B, a remote radio head (RRH), an RRH and a baseband unit (BBU), a BBU, or other type of wireless node (e.g., a picocell node, a femtocell node, a microcell node, etc.) that provides wireless access to RAN 130-1. eNodeB 120-1 may work in connection with RAN 130-1 to provide support for LTE communications, include VoLTE communication sessions.

gNodeB 120-2 may include a network device that has computational and wireless communication capabilities. For example, gNodeB 120-2 may include a transceiver system that connects UE 110 to other components of RAN 130-2 and 5 G core network 150 using wireless/wired interfaces. In some implementations, gNodeB 120-2 may be implemented as a base station (BS), a remote radio head (RRH), an RRH and a baseband unit (BBU), a BBU, or other type of wireless node (e.g., a picocell node, a femtocell node, a microcell node, etc.) that provides wireless access to RAN 130-2. gNodeB 120-2 may work in connection with RAN 130-2 to provide support for 5 G communications.

EPC 140 may include one or multiple networks of one or multiple types. For example, EPC 140 may be implemented to include a terrestrial network and/or a satellite network. According to an exemplary implementation, EPC 140 includes a network pertaining to multiple RANs 130. For example, EPC 140 may include the core part of an LTE network, an LTE-Advanced network, a legacy network, etc.

Depending on the implementation, EPC 140 may include various network elements that may be implemented in network devices 145. Such network elements may include a mobility management entity (MME), a packet data network (PDN) gateway (PGW), a serving gateway (SGW), a home subscriber server (HSS), as well other network elements pertaining to various network-related functions, such as billing, security, authentication and authorization and network polices, that facilitate the operation of EPC 140.

5 G core network 150 may include various network elements that may be implemented in network devices 155. Such network elements 155 may include a user plane function (UPF), a session management function (SMF), a core access and mobility management function (AMF), a unified data management (UDM) a policy control function (PCF), as well as other network elements pertaining to network-related functions, such as network slicing, billing, security, authentication and authorization and network policies and/or other network elements that facilitate the operation of 5 G core network 150.

Data network 160 may include one or more networks, such as a local area network (LAN), a wide area network (WAN), a metropolitan area network (MAN), a telephone network, the Internet, etc., capable of communicating with UE 110. In one implementation, data network 160 may be a packet data network (PDN) that includes an Internet Protocol (IP) Multimedia Sub-system (IMS) network (not shown in FIG. 1). An IMS network may include a network for delivering IP multimedia services and may provide media flow between two different UEs 110, and/or between a particular UE 110 and external IP networks or external circuit-switched networks (not shown in FIG. 1). Data network 160 may include various network devices which may implement different network functions described below.

The number and arrangement of devices in environment 100 are exemplary. According to other embodiments, environment 100 may include additional devices (e.g., thousands of UE 110s, hundreds of eNodeBs 120-1 and gNodeBs 120-2, dozens of RANs 130, multiple networks, etc.) and/or differently arranged devices, than those illustrated in FIG. 1.

Figure 2:
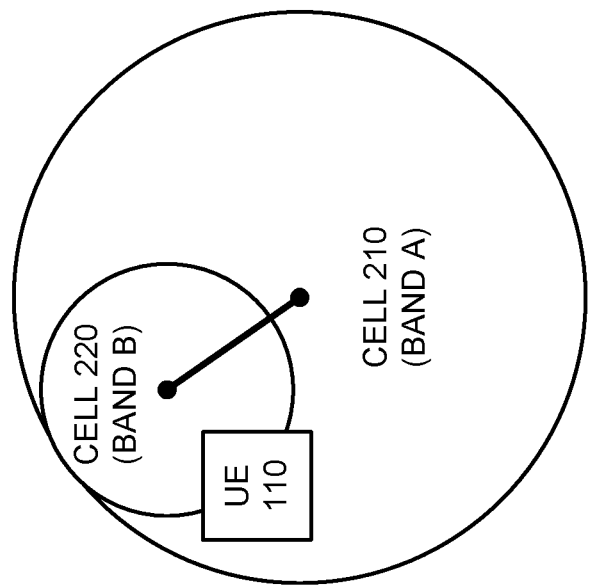
FIG. 2 illustrate exemplary cells included in a portion of the environment of FIG. 1.

As described above, in an exemplary implementation, UE 110 is an EN-DC device capable of communicating via a 4 G network (e.g., an LTE network), as well as via a 5 G network. For example, FIG. 2 illustrates a portion of environment 100 associated with one or more RANs 130 that operate in different frequency bands. Referring to FIG. 2, environment 100 includes cells 210 and 220.

Each of cells 210 and 220 may correspond to a particular coverage area supported by a particular wireless station, such as eNodeB 120-1 and gNodeB 120-2. In an exemplary implementation, cell 210 may correspond to an LTE cell associated with eNodeB 120-1 having a relatively large coverage area supporting LTE communications devices that operate in a particular frequency band, illustrated as band A. In an exemplary implementation, cell 220 may correspond to a 5 G NR cell associated with gNodeB 120-2 that has a smaller coverage area than cell 210 and operates in a frequency band, illustrated as band B, different from band A.

In this example, assume that cell 220 includes gNodeB 120-2 and that gNodeB 120-2 is able to initiate a handover to a base station, such as eNodeB 120-1. Further assume that cell 210 includes eNodeB 120-1 and is able to initiate a handover to gNodeB 120-2. The term "handover" as used herein (also referred to herein as "handoff") should be broadly construed as the process of transferring an ongoing communication session from one cell or channel to another cell or channel while the communication session is occurring and without the loss or interruption of service. The line between cells 210 and 220 in FIG. 2 represents a handover between cells 210 and 220.

Further assume that UE 110 is located in an area that is covered by cells 210 and 220. In this scenario, UE 110 may connect to eNodeB 120-1 and/or gNodeB 120-2 based on, for example, the 3rd Generation Partnership Project (3GPP) idle mode selection criteria. In an exemplary implementation, UE 110 may connect to a gNodeB 120-2 associated with cell 220 and perform a fallback to eNodeB 120-1 associated with cell 210 in response to receiving or initiating a voice communication session, as described in detail below.

Figure 3:
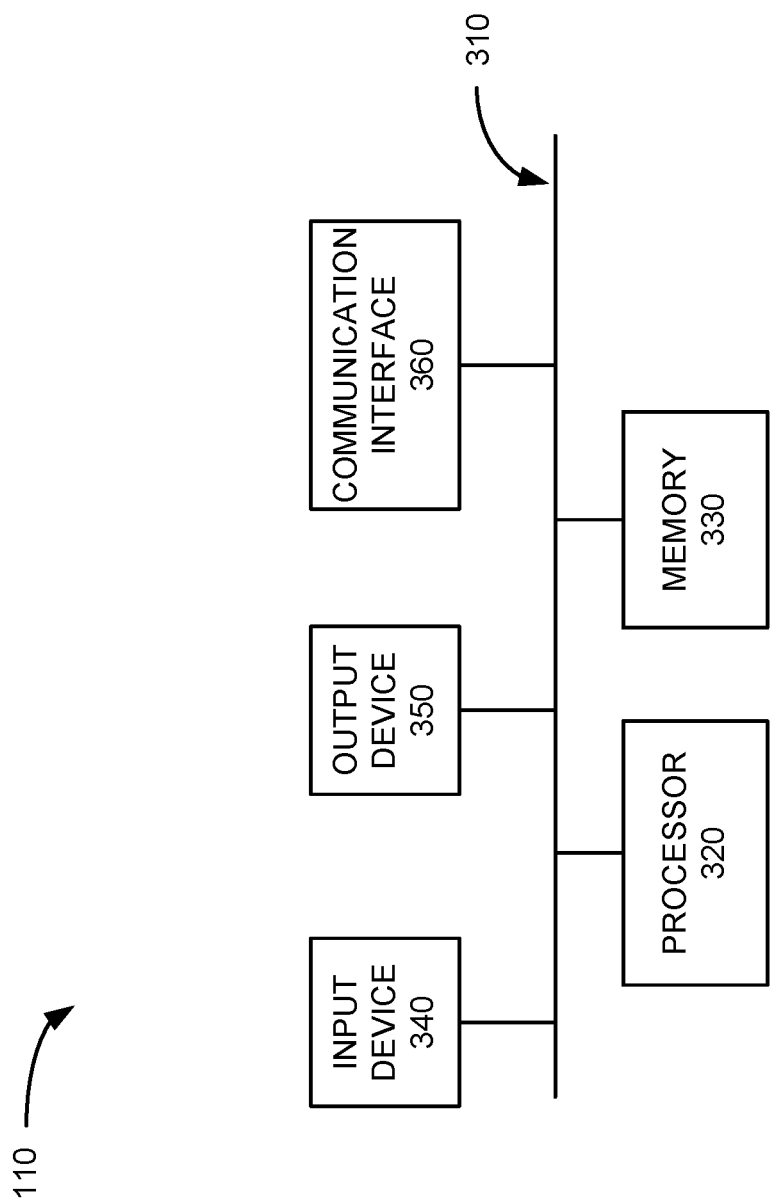
FIG. 3 illustrates an exemplary configuration of logic components included in one or more of the devices of FIG. 1.

FIG. 3 illustrates an exemplary configuration of UE 110. Other devices in environment 100, such as eNodeB 120-1, gNodeB 120-2, network devices 145 and 155 and elements in data network 160 may be configured in a similar manner. Referring to FIG. 3, UE 110 may include bus 310, processor 320, memory 330, input device 340, output device 350 and communication interface 360. Bus 310 may include a path that permits communication among the elements of UE 110.

Processor 320 may include one or more processors, microprocessors, or processing logic that may interpret and execute instructions. Memory 330 may include a random access memory (RAM) or another type of dynamic storage device that may store information and instructions for execution by processor 320. Memory 330 may also include a read only memory (ROM) device or another type of static storage device that may store static information and instructions for use by processor 320. Memory 330 may further include a solid state drive (SDD). Memory 330 may also include a magnetic and/or optical recording medium (e.g., a hard disk) and its corresponding drive.

Input device 340 may include a mechanism that permits a user to input information to UE 110, such as a keyboard, a keypad, a mouse, a pen, a microphone, a touch screen, voice recognition and/or biometric mechanisms, etc. Output device 350 may include a mechanism that outputs information to the user, including a display (e.g., a liquid crystal display (LCD)), a printer, a speaker, etc. In some implementations, a touch screen display may act as both an input device and an output device.

Communication interface 360 may include one or more transceivers that UE 110 (or wireless stations 120) uses to communicate with other devices via wired, wireless or optical mechanisms. For example, communication interface 360 may include one or more radio frequency (RF) transmitters, receivers and/or transceivers and one or more antennas for transmitting and receiving RF data via links 170. Communication interface 360 may also include a modem or an Ethernet interface to a LAN or other mechanisms for communicating with elements in a network, such as RAN 130 or another network.

The exemplary configuration illustrated in FIG. 3 is provided for simplicity. It should be understood that user device 110 (or wireless station 120) may include more or fewer devices than illustrated in FIG. 3. In an exemplary implementation, UE 110 (or wireless stations 120) perform operations in response to processor 320 executing sequences of instructions contained in a computer-readable medium, such as memory 330. A computer-readable medium may be defined as a physical or logical memory device. The software instructions may be read into memory 330 from another computer-readable medium (e.g., a hard disk drive (HDD), SSD, etc.), or from another device via communication interface 360. Alternatively, hard-wired circuitry may be used in place of or in combination with software instructions to implement processes consistent with the implementations described herein. Thus, implementations described herein are not limited to any specific combination of hardware circuitry and software.

Figure 4:
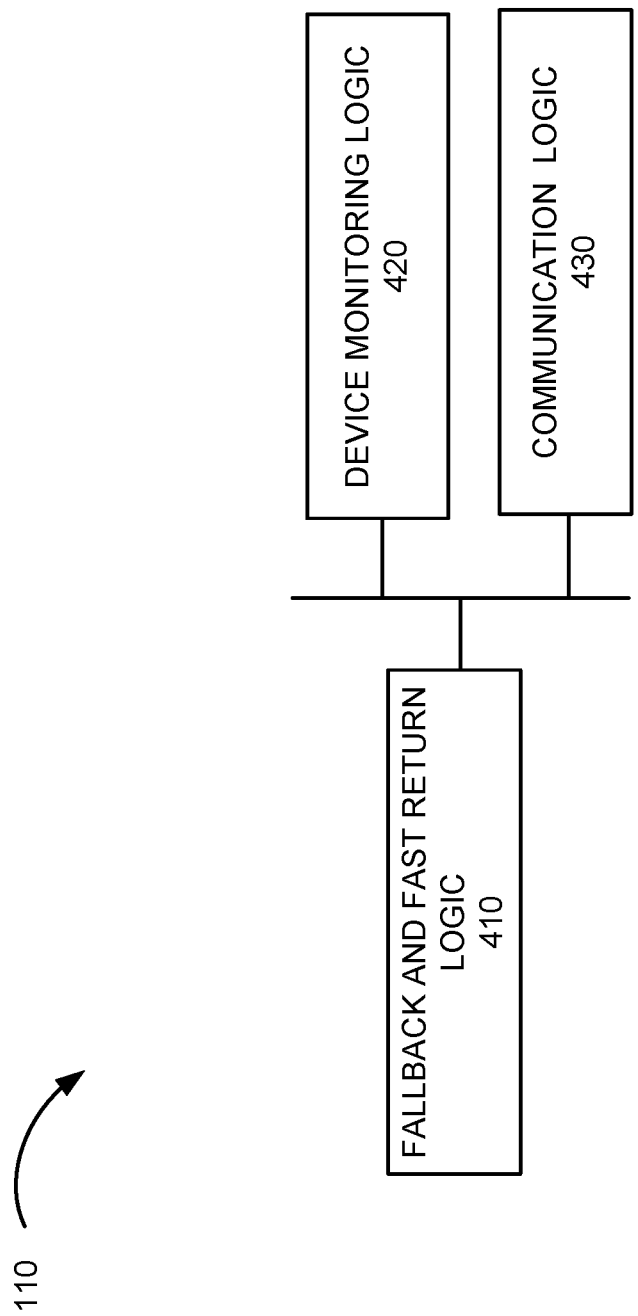
FIG. 4 illustrates an exemplary configuration of logic components implemented in the user equipment of FIG. 1.

FIG. 4 is an exemplary functional block diagram of components implemented in UE 110. In an exemplary implementation, all or some of the components illustrated in FIG. 4 may be implemented by processor 320 executing software instructions stored in memory 330. In other implementations, all or some of the components illustrated in FIG. 4 may be implemented in hardware or a combination of hardware, firmware and software used to perform the functionality described below.

Referring to FIG. 4, UE 110 may include fallback and fast return logic 410, device monitoring logic 420 and communication logic 430. In alternative implementations, these components or a portion of these components may be located externally with respect to UE 110.

Fallback and fast return logic 410 may include logic associated with UE 110 performing a fallback from a higher bandwidth connection to a lower bandwidth connection for conducting a voice communication session. Fallback and fast return logic 410 may provide information indicating UE 110's capability and/or preference to perform a fallback when a voice call is initiated or received. For example, fallback and fast return logic 410 may insert a tag or field in a communication message (e.g., a SIP signaling message, a radio resource control (RRC) protocol message) transmitted to gNodeB 120-2 indicating that UE 110 is to use an LTE connection for voice calls, such as VoLTE. The indicator may be used by other elements in environment 100, such as EPC 140, 5 G core network 150 and/or data network 160, when UE 110 registers or camps on a 5 G NR cell/network to ensure that voice communication sessions for UE 110 are conducted via an LTE network.

Device monitoring logic 420 may include logic associated with determining data throughput requirements associated with operation of UE 110. For example, device monitoring logic 420 may determine that UE 110 is executing a particular application that requires a high data throughput and low latency, such as an augmented reality game. Device monitoring logic 420 may monitor, at UE 110, the data throughput for each application executed by UE 110 and estimate current and/or future data throughput to determine whether UE 110 should perform a fast return from a 4 G cell/network to a 5 G cell/network after a fallback has been performed, as described in more detail below.

Communication logic 430 may include logic to communicate with elements in environment 100 directly or indirectly. For example, communication logic 430 may transmit and receive communications associated with establishing a radio resource control (RRC) connection with the appropriate wireless stations 120 in environment 100, such as gNodeB 120-2 or eNodeB 120-1. Communication logic 430 may also transmit an indicator associated with providing a user's preference for conducting voice communication sessions via an LTE network, as described in more detail below.

Although FIG. 4 shows exemplary components of UE 110, in other implementations, UE 110 may include fewer components, different components, differently arranged components, or additional components than depicted in FIG. 4. In addition, functions described as being performed by one of the components in FIG. 4 may alternatively be performed by another one or more of the components of UE 110.

Figure 5:
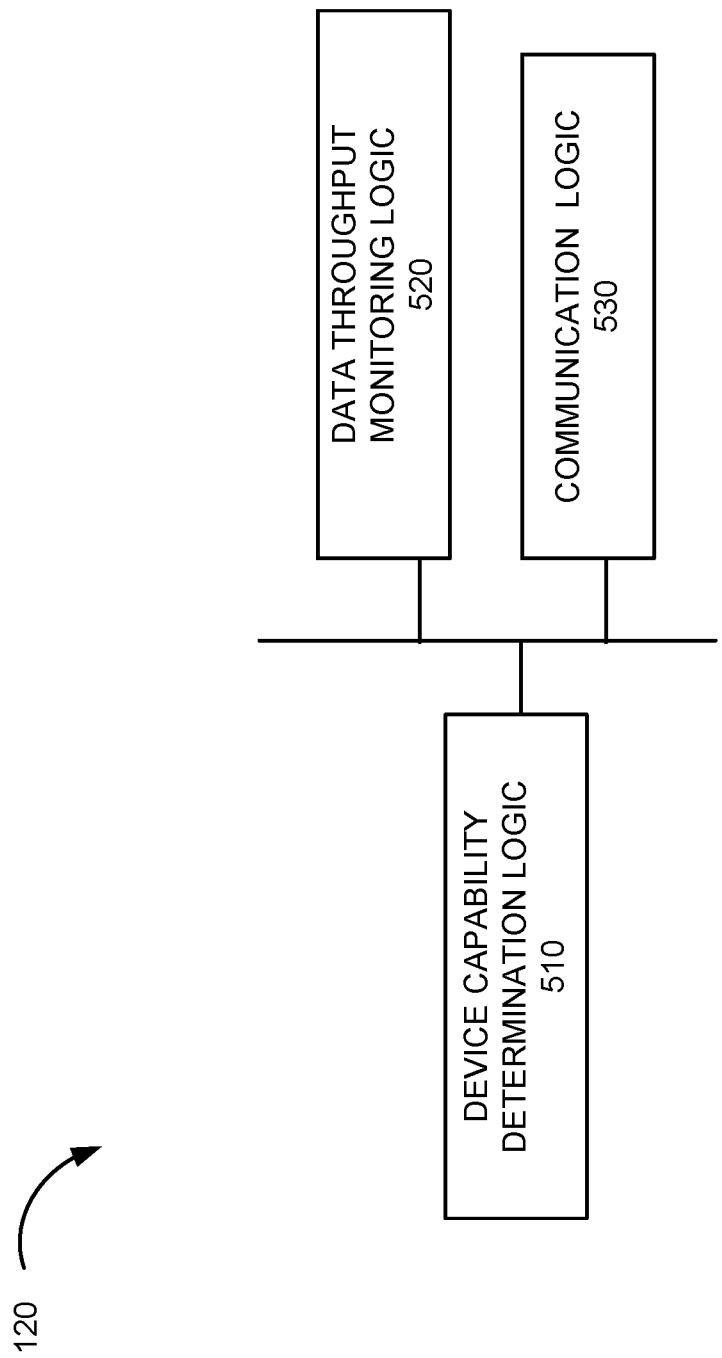
FIG. 5 illustrates an exemplary configuration of logic components implemented in a wireless station of FIG. 1.

FIG. 5 is an exemplary functional block diagram of components implemented in eNodeB 120-1 and/or gNodeB 120-2 (referred to individually as wireless station 120 and collectively as wireless stations 120). In an exemplary implementation, all or some of the components illustrated in FIG. 5 may be implemented by processor 320 executing software instructions stored in memory 330. In other implementations, all or some of the components illustrated in FIG. 5 may be implemented in hardware or a combination of hardware, firmware and/or software used to perform the functionality described below.

Wireless station 120 may include device capability determination logic 510, data throughput monitoring logic 520 and communication logic 530. In alternative implementations, these components or a portion of these components may be located externally with respect to wireless station 120.

Device capability logic 510 may include logic to identify whether a particular UE 110 is an EN-DC device capable of communicating via both 4 G and 5 G networks, or a 4 G device that is not capable of communicating via a 5 G network. For example, device capability determination logic 510 may receive information from UE 110 when UE 110 is connecting to wireless station 120 and determine whether UE 110 is an EN-DC device based on the received information.

Data throughput monitoring logic 520 may include logic to determine the current and future estimated data throughput required by a particular UE 110. For example, UE 110 may be executing one or more applications, such as an online game that requires a certain data throughput and latency. Data throughput monitoring logic 520 may monitor the data throughput at UE 110 and use this information to determine or estimate current or future data throughput requirements. Data throughput monitoring logic 520 may use this information to determine whether UE 110 should be switched to a 5 G connection after a voice communication session ends, as described in detail below.

Communication logic 530 may include logic to communicate with elements in environment 100 directly or indirectly. For example, communication logic 530 may communicate with UE 110 to establish a network connection. Communication logic 530 may also initiate communications with another wireless station, such as another LTE cell and/or a 5 G cell, to handover a communication session to the other cell, as described in detail below.

Figure 6:
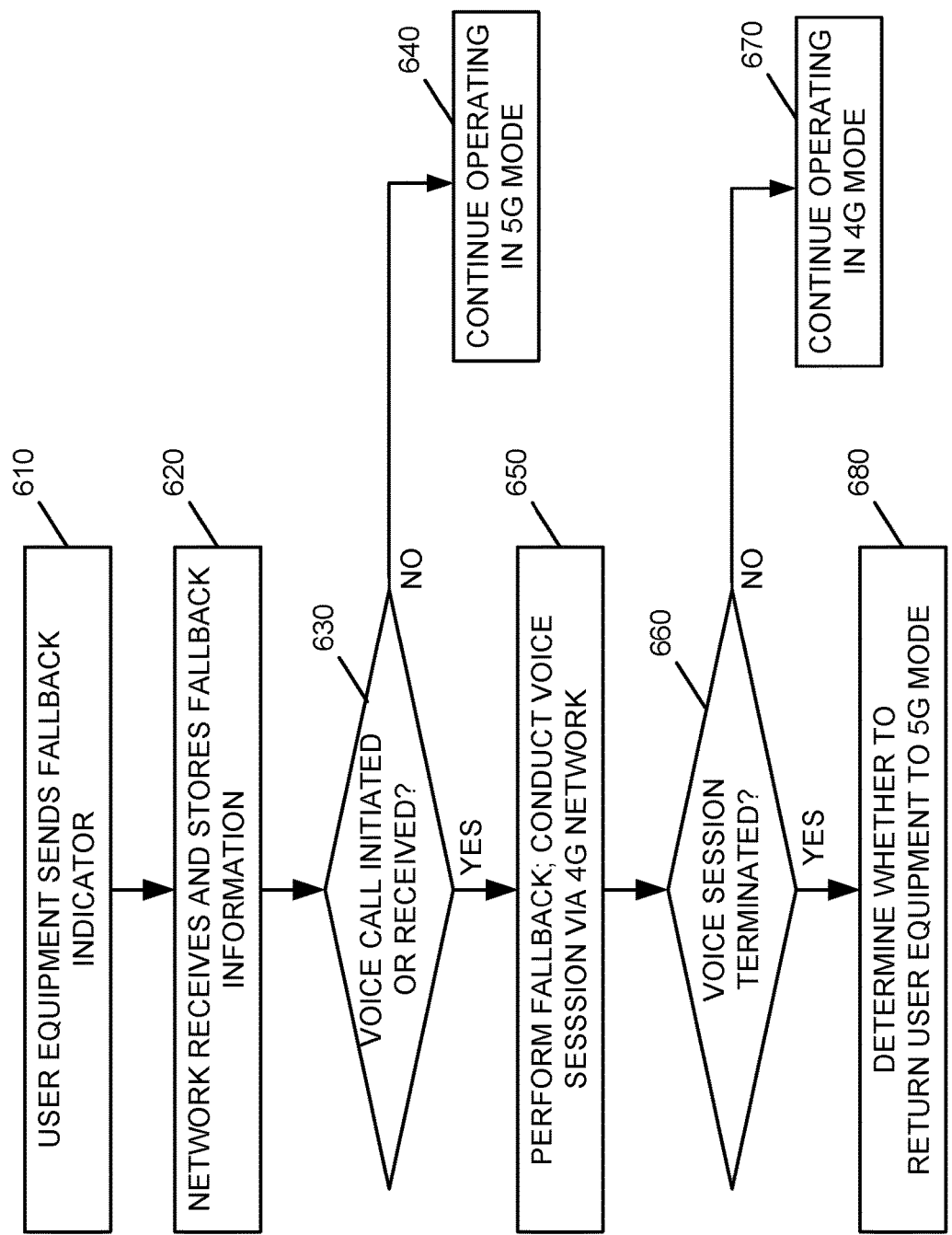
FIGS. 6 and 7 are flow diagrams illustrating processing by various components in the environment of FIG. 1 in accordance with an exemplary implementation.
Figure 7:
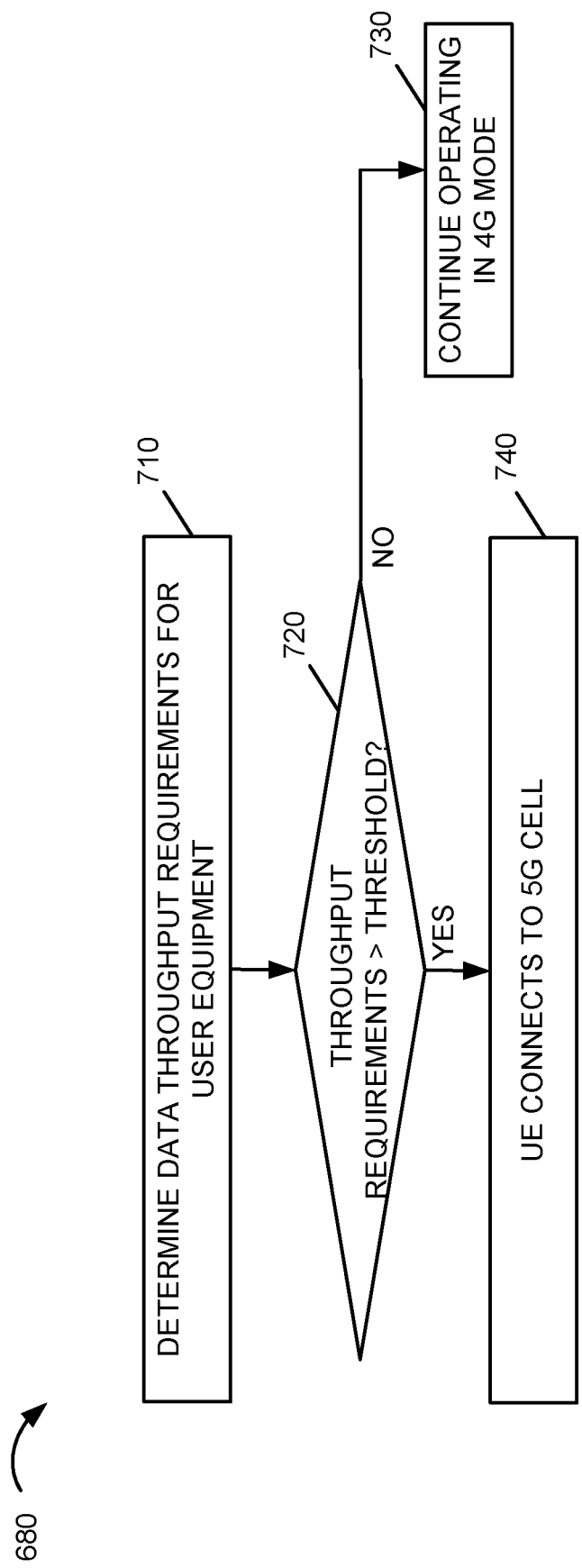

FIGS. 6-7 are flow diagrams illustrating exemplary processing associated with UE 110 connecting to a 5 G cell, performing a fallback to an LTE network and performing a return to the 5 G network. Assume that UE device 110 is an EN-DC device. In this scenario, during communications with gNodeB 120-2 to establish a connection, UE 110 may transmit information identifying capabilities associated with UE 110, including information indicating that UE 110 is an EN-DC device. Device capability determination logic 510 receives the information from UE 110 and determines that UE 110 is EN-DC enabled.

Further assume that UE 110 establishes a 5 G connection with gNodeB 120-2 and transmits information indicating UE 110's preference associated with performing a fallback for a voice communication session (block 610). For example, UE 110 typically transmits a session initiation protocol (SIP) Register message when registering with EPC 140, 5 G core network 150 and/or data network 160. In an exemplary implementation, UE 110 may include an indictor or tag in a message transmitted to gNodeB 120-2. The indicator or tag includes UE's 110 preference for using a 4 G connection for voice communications. For example, UE 110 may include a fallback indicator in a header field or another field of the SIP Register message. Further assume that gNodeB 120-2 is configured to recognize the fallback indicator.

In this implementation, UE 110 transmits the SIP Register message to gNodeB 120-2, which forwards the message to 5 G core network 150. In response, 5 G core network 150 may forward the SIP register message to data network 160. The SIP Register message may be received by a call session control function (CSCF) element in data network 160 (e.g., a CSCF element within an IMS core), which is also configured to recognize the fallback indicator.

In another implementation, UE 110 may transmit a radio resource control (RRC) message to gNodeB 120-2 advertising UE 110's fallback capability and/or preference. For example, UE 110 may transmit a RRC Connection Setup Request Initial UE Identity (IE) message with information indicating the user's fallback preference. Alternatively, UE 110 may transmit an RRC Connection Setup Request Establishment Cause message with the fallback information to indicate that UE 110 wishes to use a fallback procedure in response to receiving a voice communication. That is, UE 110 signals gNodeB 120-2 that voice communication sessions are to be conducted via an LTE network (e.g., via a VoLTE connection).

In each case, gNodeB 120-2 may receive the fallback information and store the information (block 620). gNodeB 120-2 may also transmit the fallback information to 5 G core network 150 and 5 G core network 150 may store the fallback information for UE 110 in network device 155.

After UE 110 has established a 5 G network connection with gNodeB 120-2, UE 110 may transmit and receive 5 G communications via RAN 130-2 and 5 G core network 150. For example, assume that UE 110 is executing an application, such as an augmented reality (AR) game that uses data streamed via data network 160. Further assume that the application executed by UE 110 requires a high data throughput, such as a data throughput that is optimized via 5 G communications over RAN 130-2. Communication logic 530 may then determine whether UE 110 has initiated or is receiving a voice communication (block 630). If gNodeB 120-2 determines that UE 110 has not initiated or is not receiving a voice communication (block 630—no), UE 110 may continue to operate in a 5 G communication mode, such as a 5 G standalone mode (block 640).

However, if gNodeB 120-2 determines that UE 110 has initiated or is receiving a voice communication, such as a telephone call (block 630—yes), gNodeB 120-2 may initiate a fallback procedure to allow the voice communication session to proceed via a 4 G LTE network, such as via EPC 140 and data network 160 (block 650). For example, gNodeB 120-2 may handover the existing data communication session(s) to eNodeB 120-1 in response to determining that a voice communication session has been initiated. eNodeB 120-1 may then establish a network connection with UE 110 to allow UE 110 to conduct the voice communication session via EPC 140 and data network 160 (block 650).

As a result of establishing the connection to eNodeB 120-1, UE 110 may switch from operating in a 5 G standalone mode and begin communicating with eNodeB 120-1 in a 4 G mode. In this situation, UE 110 may communicate with eNodeB 120-1 via link 170-1 and connect with EPC 140 and data network 160 (e.g., an IMS network within data network 160) to allow the voice communication session to proceed via the 4 G LTE network. In this implementation, UE 110 may continue to have LTE data support, as well as voice support. For example, in the example described above, if UE 110 was executing an application, such as an AR game (e.g., a non-IMS packet data session), the packet data session may continue over the 4 G LTE network to allow UE 110 to continue to execute the application. However, the data throughput and/or latency associated with EPC 140 as compared to 5 G core network 150 may result in UE 110 experiencing a lower data throughput and higher latency for the packet data session associated with the AR game.

eNodeB 120-1 may continue to support communications to/from UE 110 and determine if the voice communication session has been terminated (block 660). If the voice call has not been terminated, UE 110 continues operating in the 4 G mode (block 670). If, however, the voice call has been terminated (block 660—yes), UE 110 may determine whether to return to the 5 G standalone mode, as opposed to waiting for UE 110 to enter an idle state and then trying to reconnect to a 5 G cell, such as cell 220, and operating in a 5 G standalone mode (block 680).

In an exemplary implementation, UE 110 may automatically reconnect to a 5 G cell once the voice call has been terminated. For example, eNodeB 120-1 may handover communications to gNodeB 120-2 and UE 110 may reconnect to the 5 G RAN 130-2 upon termination of the voice communication session, provided that UE 110 is able to connect to a 5 G NR cell. In other implementations, UE 110 may determine whether to reconnect to a 5 G cell based on certain conditions/thresholds.

For example, FIG. 7 illustrates exemplary processing associated with block 680 and determining whether to attempt to reconnect UE 110 to a 5 G cell. Referring to FIG. 7, processing may include determining data throughput and/or latency requirements associated with operation of UE 110 (block 710). Continuing with the example above in which UE 110 was executing a AR video game prior to the voice communication session and is still executing the video game application, device monitoring logic 420 in UE 110 may estimate the current and future data throughput and/or latency requirements associated with playing the AR game. For example, device monitoring logic 420 may estimate the future data throughput based on the historical throughput requirements associated with playing the AR game.

In an alternative implementation, data throughput monitoring logic 520 at eNodeB 120-1 may estimate the data throughput requirement based on the amount of data being streamed while UE 110 is connected to the 4 G LTE network. In still another implementation, data throughput monitoring logic 520 may communicate with other elements in environment 100, such as data network 160 and/or gNodeB 120-2 to determine or estimate the current and future data requirements associated with executing the AR game.

In each case, UE 110 and/or eNodeB 120-1 may determine whether the data throughput requirements associated with UE 110 is greater than a predetermined threshold (block 720). The threshold may be based on data throughput requirements available via a 4 G network versus the data throughput requirements provided by a 5 G network.

If device monitoring logic 420 and/or data throughput monitoring logic 520 determines that the data throughput requirement for UE 110 is not greater than the threshold (block 720—no), UE 110 may continue to operate in a 4 G mode (block 730). In this case, the service provider associated with the 4 G LTE and 5 G networks (e.g., EPC 140 and 5 G core network 150) may determine that keeping UE 110 on the 4 G LTE network saves network resources and does not adversely impact the user experience. Maintaining the 4 G connection may allow the service provider to manage and optimize use of network resources and also reduce possible issues with performing handovers, such as a lost connection, when the 4 G LTE network provides UE 110 with adequate service.

If, however, device monitoring logic 420 and/or data throughput monitoring logic 520 determines that the data throughput requirement is greater than the threshold, eNodeB 120-1 may handover communications for UE 110 to gNodeB 120-2 and UE 110 may connect to a 5 G cell (block 740). For example, UE 110 may reconnect to RAN 130-2 (e.g., associated with cell 220) and connect to 5 G core network 150 and resume operations in a 5 G standalone mode. In this manner, UE 110 may quickly reconnect to a higher throughput data network in a manner that is transparent to UE 110. That is, the handover is performed without user interaction and without UE 110 having to enter an idle state/mode. UE 110 may then continue executing applications, such as the AR game, with the high data throughput and low latency associated with the 5 G network.

As described above with respect to FIGS. 6 and 7, UE 110 may fallback from a 5 G connection to an LTE connection when a voice communication is initiated, and return to a 5 G standalone mode when the voice communication session ends. In this scenario, UE 110's voice communication session and data session may operate in accordance with 4 G standards/protocols. That is, UE 110 may operate in a 4 G mode with respect to all data sessions when the handover from gNodeB 120-2 to eNodeB 120-1 is performed. However, in another implementation, when gNodeB 120-2 hands over communications to eNodeB 120-1 in response to a voice communication session, EPC 140 may route non-voice packet data communication sessions through RAN 130-2 while routing voice communication sessions through RAN 130-1.

For example, a packet gateway (PGW) in EPC 140 may route data for a packet data session (e.g., a non-voice non-IMS packet data unit session) through RAN 130-2 to UE 110. Continuing with the example above in which UE 110 was executing an AR game when the voice communication session was initiated, the PGW in EPC 140 may forward the data associated with execution of the AR game from data network 160 through EPC 140 to gNodeB 120-2 to UE 110. UE 110 may then operate in a 5 G non-standalone mode. That is, some communications will commence over the 4 G network and other portions of the communications may commence over a portion of a 5 G network. In this manner, the voice communication session may commence over the LTE network (e.g., EPC 140) while at least a portion of the packet data session for the AR game is provided via a 5 G connection, such as a 5 G RAN (e.g., RAN 130-2). In this implementation, after the voice call is terminated, gNodeB 120-2 may reconnect to 5 G core network 150 and UE 110 may operate in a 5 G standalone mode, or remain in a 5 G non-standalone mode. The transition from the 5 G non-standalone mode to the 5 G standalone mode may be based on data throughput requirements associated with UE 110, as described above with respect to FIG. 7. In an alternative implementation, UE 110 may automatically transition from the 4 G mode to the 5 G standalone mode when the voice communication session ends. In this implementation, UE 110 may transition to the 5 G standalone mode without making a determination regarding the data throughput requirements associated with UE 110.

As described above, UE 110 may fallback from a 5 G connection to a 4 G connection and transition back to a 5 G mode based on, for example, data throughput requirements associated with UE 110. In some implementations, the determination regarding whether to return UE 110 to a 5 G standalone mode may be based on and/or enhanced by determining UE 110's geolocation.

For example, UE 110 may include global positioning system (GPS) logic to identify the current location of UE 110. In this implementation, based on the current location of UE 110, UE 110 may remain in a 4 G mode, or a 5 G non-standalone mode based on its location. For example, assume that UE 110 is located in a sports stadium with 50,000 other people/wireless customers associated with EPC 140 and 5 G core network 150. Based on the current location of UE 110, communication logic 430 in UE 110 may determine that 5 G coverage at UE's 110 current location is not attainable and/or the service may not be adequate. In this case, UE 110 may remain in a 4 G mode or a 5 G non-standalone mode based on its current location.

In addition, as described above, UE 110 may fallback to a 4 G connection to support voice communication sessions. In some implementations, the fallback processing may be enabled/disabled based on a user's selection. For example, UE 110 may include a graphical user interface (GUI) that allows the user to select whether to fallback to an LTE connection for voice communications as opposed to using 5 G VoNR for voice communication sessions. In other implementations, the service provider associated with EPC 140 and 5 G core network 150 may configure UE 110 using default settings based on, for example, VoNR deployment and UE 110's coverage plan. For example, the service provider may provide for automatically performing a fallback in areas where 5 G NR resources may not be adequate to support VoNR communication sessions. In this manner, the service provider may optimize the user's experience and efficiently manage network resources.

Implementations described herein provide for performing a fallback for a UE device in response to the UE device receiving or initiating a voice call and then optionally performing a fast return to the higher bandwidth network when the voice session is finished. Switching the UE device to the appropriate network may increase efficiency at the service provider's network and enhance the user's experience. In addition, reconnecting the UE device to higher bandwidth network allows the UE device to take advantage of 5 G services when the UE device is located in an area where 5 G services are available.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to an EN-DC device falling back to a 4 G communication mode in response to receiving or initiating a voice communication session. In other instances, UE 110 may fallback to a lower bandwidth connection in response to other factors, such as problems on the 5 G network, and perform a fast return when the 5 G problem is resolved. That is, the fallback may be used as a work-around when issues exist on a 5 G network to allow UE 110 to maintain connectivity. In each case, UE 110 may connect to the lower bandwidth network and return to the higher bandwidth network without UE 110 having to go into an idle state/mode to reconnect to the higher bandwidth network.

In addition, in other implementations, processing described herein may be used to fallback from any higher bandwidth connection to a lower bandwidth connection, such as from a next generation connection that is higher than 5 G to a 5 G connection.

Further, while series of acts have been described with respect to FIGS. 6 and 7, the order of the acts may be different in other implementations. Moreover, non-dependent acts may be implemented in parallel.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:

establishing, by a Fifth Generation (5 G) wireless station, a network connection with a user equipment (UE) device;

receiving, by the 5 G wireless station, at least one of a session initiation protocol (SIP) signaling message or radio resource control (RRC) signal message comprising information associated with handling voice communication sessions for the UE device, wherein the information indicates that the UE device is to conduct voice communication sessions over a Fourth Generation (4 G) network;

receiving information, from the UE device or directed to the UE device, associated with a first voice communication session;

signaling a 4 G wireless station to establish a connection to the UE device, in response to receiving the information associated with the first voice communication session;

establishing, by the 4 G wireless station, a connection to the UE device;

conducting the first voice communication session over the 4 G network;
determining whether the first voice communication session has terminated; and
determining whether to reconnect to a 5 G network, in response to determining that the first voice communication session has terminated.

2. The method of claim 1, wherein the determining whether to reconnect to the 5 G network comprises:
estimating a data throughput requirement associated with operation of the UE device, and
determining whether the data throughput requirement is greater than a threshold.

3. The method of claim 2, further comprising:
initiating a reconnection to the 5 G network in response to determining that the data throughput requirement is greater than the threshold.

4. The method of claim 1, wherein the determining whether to reconnect to the 5 G network comprises:
automatically initiating a reconnection to the 5 G network in response to determining that the first voice communication session has terminated.

5. The method of claim 1, further comprising:
reconnecting to the 5 G network without the UE device entering an idle state.

6. The method of claim 1, wherein the receiving at least one of the SIP signaling message or RRC signal message comprises:
receiving a SIP register message including the information indicating that the UE device is to conduct voice communication sessions over the 4 G network.

7. The method of claim 1, wherein the receiving at least one of the SIP signaling message or RRC signal message comprises:
receiving, by the 5 G wireless station, an RRC message including the information indicating that the UE device is to conduct voice communication sessions over the 4 G network.

8. The method of claim 1, wherein the determining whether to reconnect to the 5 G network comprises:
identifying a location associated with the UE device, and
determining whether to reconnect to the 5 G network based on the location.

9. The method of claim 1, further comprising:
providing a default configuration for the UE device based on at least one of a user selection or 5 G voice over new radio (VoNR) coverage.

10. A system, comprising:
a Fifth Generation (5 G) wireless station; and
a Fourth Generation (4 G) wireless station,
wherein the 5 G wireless station is configured to:
establish a network connection with a user equipment (UE) device,
receive at least one of a session initiation protocol (SIP) signaling message or radio resource control (RRC) signal message comprising information associated with handling voice communication sessions for the UE device, wherein the information indicates that the UE device is to conduct voice communication sessions over a 4 G network,
receive information associated with a first voice communication session,
transmit a communication to the 4 G wireless station to establish a connection to the UE device, in response to receiving the information associated with the first voice communication session, and
wherein the 4 G wireless station is configured to:
receive the communication from the 5 G wireless station,
establish a connection to the UE device,
conduct the first voice communication session over the 4 G network,
determine whether the first voice communication session has terminated, and
determine whether to signal the 5 G wireless station to reconnect the UE device to a 5 G network, in response to determining that the first voice communication session has terminated.

11. The system of claim 10, wherein when determining whether to signal the 5 G wireless station to reconnect to the 5 G network, the 4 G wireless station is configured to:
estimate a data throughput requirement associated with operation of the UE device, and
determine whether the data throughput requirement is greater than a threshold.

12. The system of claim 11, wherein when determining whether to signal the 5 G wireless station to reconnect to the 5 G network, the 4 G wireless station is configured to:
signal the 5 G wireless station to reconnect to the 5 G network in response to determining that the data throughput requirement is greater than the threshold.

13. The system of claim 12, wherein the receiving at least one of the session initiation protocol (SIP) signaling message or radio resource control (RRC) signal message comprises receiving a SIP register message.

14. The system of claim 10, wherein when determining whether to signal the 5 G wireless station to reconnect the UE device to the 5 G network, the 4 G wireless station is configured to:
automatically initiate a reconnection to the 5 G network without the UE device entering an idle state.

15. The system of claim 10, wherein when determining whether to signal the 5 G wireless station to reconnect the UE device to the 5 G network, the 4 G wireless station is configured to:
identify a location associated with the UE device, and
determine whether to signal the 5 G wireless station based on the location.

16. A method, comprising:
establishing, by a user equipment (UE) device, a Fifth Generation (5 G) network connection with a first wireless station;
transmitting at least one of a session initiation protocol (SIP) signaling message or radio resource control (RRC) signal message including information to the first wireless station indicating that the UE device is to conduct voice communication sessions over a Fourth Generation (4 G) network;
at least one of receiving data associated with a voice communication session or initiating a voice communication session;
establishing, by the UE device, a 4 G network connection with a second wireless station, in response to the at least one of receiving data or initiating the voice communication session;
determining, by the UE device, whether the voice communication session has terminated; and
determining, by UE device, whether to reconnect to the 5 G network, in response to determining that the voice communication session has terminated.

17. The method of claim 16, wherein the determining whether to reconnect to the 5 G network comprises:
estimating, by the UE device, a data throughput requirement associated with operation of the UE device, and determining, by the UE device, whether the data throughput requirement is greater than a threshold.

18. The method of claim 17, further comprising:
initiating, by the UE device, a reconnection to the 5 G network in response to determining that the data throughput requirement is greater than the threshold.

19. The method of claim 17, further comprising:
automatically initiating, by the UE device, a reconnection to the 5 G network in response to determining that the voice communication session has terminated.

20. The method of claim 16, wherein the transmitting at least one of the session initiation protocol (SIP) signaling message or radio resource control (RRC) signal message comprises transmitting a SIP register message.

* * * * *